United States Patent [19]
Schmid

[11] Patent Number: 5,490,934
[45] Date of Patent: Feb. 13, 1996

[54] METHOD OF BIOLOGICAL DENITRIFICATION

[75] Inventor: Lawrence A. Schmid, 3107 Harahay Ridge, Manhattan, Kans. 66502

[73] Assignee: Lawrence A. Schmid, Manhattan, Kans.

[21] Appl. No.: 468,515

[22] Filed: Jun. 6, 1995

Related U.S. Application Data

[63] Continuation of Ser. No. 113,248, Aug. 30, 1993, abandoned.

[51] Int. Cl.⁶ ...................................................... C02F 3/28
[52] U.S. Cl. .................................. 210/614; 210/903
[58] Field of Search .................................. 210/605, 614, 210/616–618, 903, 601, 631, 630

[56] References Cited

U.S. PATENT DOCUMENTS

| | | | |
|---|---|---|---|
| 3,236,766 | 2/1966 | Levin | 210/605 |
| 3,846,289 | 11/1974 | Jeris et al. | 210/903 |
| 3,964,998 | 6/1976 | Barnard | 210/605 |
| 3,994,802 | 11/1976 | Casey et al. | 210/605 |
| 4,655,925 | 4/1987 | Tabata et al. | 210/605 |
| 4,917,805 | 4/1990 | Reid | 210/605 |
| 4,970,000 | 11/1990 | Eppler et al. | 210/903 |
| 5,160,043 | 11/1992 | Kos | 210/605 |
| 5,266,200 | 11/1993 | Reid | 210/605 |

*Primary Examiner*—Thomas Wyse
*Attorney, Agent, or Firm*—Hovey, Williams, Timmons & Collins

[57] ABSTRACT

A process for providing biological denitrification of a previously nitrified wastewater includes the initial step of supplying to a tank an influent including a relatively small concentration of biomass and a fraction of nitrates. The influent is supplied adjacent a bottom of the tank, and a volume of waste water is retained in the tank. This volume in the tank has a biomass concentration greater than the influent biomass concentration, and the biomass in the tank provides biological denitrification of the wastewater during movement of the wastewater through the tank. Effluent is delivered from the tank, and includes a biomass concentration substantially equal to the influent biomass concentration and is substantially free of nitrates relative to the influent, the effluent being drawn from a top of the tank. During the process, the wastewater in the tank is intermittently mixed to maintain the biomass in suspension within the tank and to assist in controlling the concentration of biomass in the tank.

6 Claims, 3 Drawing Sheets

METHOD OF BIOLOGICAL DENITRIFICATION

This application is a Continuation of application Ser. No. 08/113,248, filed 30 Aug. 1993, now abandoned.

BACKGROUND OF THE INVENTION

1. Field of the Invention

The present invention relates to a process for providing denitrification of a previously nitrified wastewater, wherein a natural biomass is collected within the wastewater, the endogenous respiration of the biomass creating an oxygen demand sufficient to promote bacterial denitrification without the need for an outside carbon source such as methanol or the like.

2. Discussion of the Prior Art

Nitrogen in various chemical forms is found in sewage and industrial wastes that in sufficient concentration may be considered a pollutant. It can serve as a nutrient for algae which with excessive nitrogen may cause nuisance algal blooms. Reduction of the nitrogen in effluent from wastewater treatment plants can help control these problems.

Nitrogen in its oxidized states (e.g. as nitrates or nitrites) can seep into ground waters, causing problems in drinking water. Drinking water standards generally limit the concentration of nitrate to 5 to 10 mg/l, yet effluent from a modern treatment plant may have natural levels greater than 20 mg/l. Nitrogen in its reduced state, as ammonia, is toxic to fish, and severe limits are in effect on many streams to control the maximum concentration.

A conventional method of nitrogen removal is by biological means. With sufficient time, oxygen, and the proper mass of microorganisms, organic nitrogen is biologically converted to ammonia and then further oxidized to nitrate forms. This conversion occurs under aerobic (with oxygen) conditions, and is relatively easy to accomplish, resulting naturally under different known types of waste treatment processes. At this point the nitrogen has not been reduced in concentration, only converted to a different form.

A practical means to remove nitrate is to convert them to nitrogen gas. At this point $N_2$ will evolve from the water and become atmospheric nitrogen. As atmospheric nitrogen, it is not a water pollutant. Nitrates are best converted to nitrogen gas by microbial action. Under anoxic conditions (without free dissolved oxygen), many common bacteria with a demand for oxygen are able to biochemically remove the oxygen from the nitrate ion, leaving nitrogen gas. This process is called biological denitrification.

For denitrification to occur, the nitrogen must first be converted to nitrates and then the bacteria must have a food source to create a demand for oxygen. This food source may be from outside, like a chemical addition of methanol, by the addition of sewage, or by the natural demand of the organisms (endogenous respiration). This natural demand must occur under conditions where free oxygen is absent.

Denitrification is carried out in tanks constructed to hold the microbial mass in suspension. When sewage is used for the food source it must be used at the start of the biological process. The aeration tank contents containing the nitrates are recirculated to a separate tank and mixed with the sewage without aeration. The resultant demand converts the nitrates to nitrogen gas. This process is limited to intermediate removal levels only, as there is a practical limit to how much wastewater can be recirculated.

Conventionally, in order to obtain near complete nitrogen removal it is necessary to treat the entire stream after all nitrification has occurred and without any contamination by the ammonia in the raw waste. This requires a separate tank downstream of all nitrification processes and upstream of any final clarifying processes. At this point sewage cannot be used as the food source, and the carbon source is limited to a clean outside food source, such as added methanol, or the oxygen demand caused by the bacteria themselves.

The latter option of allowing the bacteria to create the oxygen demand is slow, and is related to time and the concentration of organisms. If the organism concentration throughout the process is doubled, the reaction will occur nearly twice as fast. However, there is a practical limit to how high one can raise the concentration of the organisms within the process. If a system is operated at a high microorganism concentration, the mass may be sufficient to promote good endogenous nitrate reduction. However the mass may be too high to promote good sedimentation and excess solids will be in the effluent. These solids contain organic nitrogen which will have the same detrimental effect in the streams.

Also, if solids are maintained at a high level throughout the process, they become old and have very little endogenous demand, and even though a high concentration may be obtained, denitrification will be slow or incomplete. Therefore it becomes quite difficult to operate denitrification without methanol addition at the lower solids levels required to meet other treatment objectives.

After the waste exits the denitrification tank, it must be aerated again to add free oxygen back to the waste stream. The purpose of this is to add needed oxygen back to the liquid and to strip nitrogen gas from the system to promote better sedimentation within the final sedimentation tank. If methanol has been added, oxygen is required to metabolize the excess methanol so it does not discharge into the streams and lakes.

The liquid from the first aeration tank is made up of a suspension of bacteria. This concentration may typically be in the range of 2000 to 3000 mg/l. As this stream enters the anoxic tank, it contains a residual oxygen from the first tank that must be used up before any denitrification can occur. The rate at which this deoxygenation and denitrification can occur is strictly related to the number and activity of the organisms. If the organisms can be increased in numbers, complete denitrification can occur, and can occur in a smaller tank.

OBJECTS AND SUMMARY OF THE INVENTION

It is an object of the present invention to provide a process of denitrifying wastewater by increasing the biomass concentration within the denitrification tank without increasing the biomass concentration throughout the rest of the wastewater treatment processes. This object of providing increased biomass concentration in the denitrification tank allows for biological denitrification to occur without the need for supplementary chemical additives. In addition, by obtaining this object it is possible to reduce the tank size used in the process, resulting in a savings in the cost of setting up and using the process.

It is another object of the present invention to provide a denitrification process which allows an operator to control the biomass concentration within the denitrification tank by setting the delay between and duration of mixing cycles forming a part of the process. By allowing this control, an operator is able to raise the biomass concentration within the denitrification tank to a desired level, and to then maintain this level during steady state operation of the process while the biomass concentration of the influent and effluent remains constant.

In accordance with these and other objects evident from the following description of the preferred embodiment of the inventive process, the process of denitrifying wastewater includes the steps of supplying to a tank an influent including a relatively small concentration of biomass and a fraction of nitrates, the influent being supplied adjacent a bottom of the tank, and retaining in the tank a volume of wastewater having a biomass concentration greater than the influent biomass concentration. The biomass in the tank provides biological denitrification of the wastewater during movement of the wastewater through the tank, and an effluent is delivered from the tank, the effluent including a biomass concentration substantially equal to the influent biomass concentration and being substantially free of nitrates relative to the influent. The effluent is drawn from the top of the tank at a side of the tank, generally opposite of the point at which the influent is introduced. The wastewater in the tank is intermittently mixed to maintain the biomass in suspension within the tank and to control the concentration of biomass in the tank.

By providing this process, numerous advantages are obtained. For example, by increasing the bacterial level within the denitrification tank, effective nitrogen removal is obtained without the need for expensive chemicals, thus reducing the cost of the process. At the same time, the increased bacterial level within the tank is not co-existent with such increased levels in the influent or effluent. Accordingly, sedimentation of the effluent in downstream processes is not adversely effected, and the level of solids in the effluent containing organic nitrogen is maintained at a low level.

In addition, because the solids are introduced into the tank with the influent, and the concentration of solids is increased only within the denitrification tank, the biomass does not grow old, and maintains an active endogenous demand.

BRIEF DESCRIPTION OF THE DRAWING FIGURES

The preferred embodiment of the present invention is described in detail below with reference to the attached drawing figures, wherein.

DETAILED DESCRIPTION OF THE PREFERRED EMBODIMENT

Figure 1:
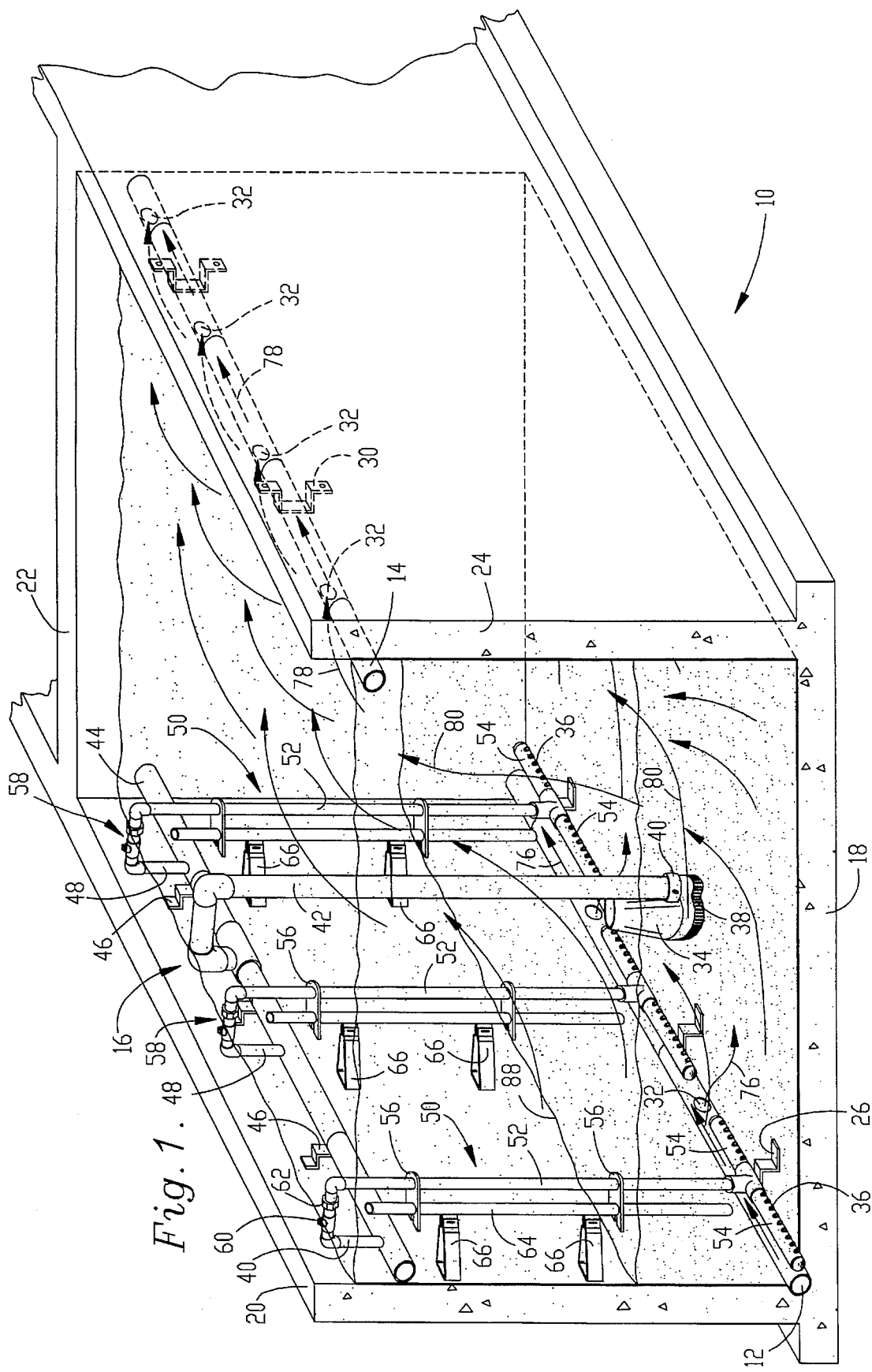
FIG. 1 is a schematic perspective view of a denitrification tank constructed in accordance with the preferred embodiment, illustrating a settlement step of the denitrification process.

An apparatus for carrying out the denitrification process of the present invention is illustrated in FIG. 1, and includes a rectangular tank 10, a wastewater inlet 12, a wastewater outlet 14, and a mixing system 16.

The tank is formed of concrete or any other suitable material, and is open topped, including a bottom wall 18 and four side walls 20, 22, 24, one of which is cut away in the figures to show the interior of the tank. Thus, the tank is rectangular, and has a depth of 10–15 feet, although other constructions may be used where appropriate.

The inlet is defined by an inlet pipe 12 extending along the corner edge between the bottom wall 18 and one side wall 20 of the tank. The pipe is secured to the bottom wall by a plurality of brackets 26, and includes a number of holes 28 through which wastewater is introduced into the tank. Preferably, the inlet pipe is formed of polyvinylchloride (PVC). However, other conventional noncorrosive materials may be used.

The wastewater outlet is defined by a weir or pipe 14 that extends along an upper edge of the side wall 24 generallyb opposing the side wall 20 adjacent the inlet pipe. The outlet pipe is supported on the side wall by brackets 30, and includes a plurality of openings 32 through which wastewater passes and is delivered from the tank.

The mixing system 16 is supported on the side wall 20 of the tank adjacent the inlet pipe, and broadly includes a pump 34 for drawing wastewater into the system from adjacent the bottom wall of the tank, and a plurality of nozzles 36 for injecting the pumped wastewater back into the tank to cause mixing of the wastewater within the tank.

The pump 34 is a conventional submersible pump having an inlet 38 and an outlet 40. A conduit 42 formed of PVC or the like is connected to the pump outlet 40 and delivers wastewater from the pump to a supply pipe 44 located adjacent the top of the tank. The supply pipe 44 is mounted to the side wall 20 by a plurality of brackets 46, and includes several branch lines 48, each connected with a fluid delivery pipe assembly 50.

Each fluid delivery pipe assembly includes a vertical pipe section 52 having upper and lower ends, a pair of horizontally extending sections 54 connected to the lower end of the vertical section by a T-shaped fitting, a plurality of the nozzles 36 provided on the horizontally extending sections, a connection means at the upper end of the vertical pipe section for connecting each pipe assembly with the supply pipe and for selectively disconnecting the assembly from the supply pipe, and a plurality of spacers 56 for supporting the pipe assembly on a support structure.

The vertical and horizontal sections 52, 54 of the pipe assembly, as well as the T-fitting and at least some or all of the components of the connection means are formed of PVC, which is a lightweight material presenting an assembly that may be handled by a single person. It is noted that other such materials may be used which provide a lightweight assembly capable of being lifted manually from the tank and presenting a noncorrosive surface to the contents of the tank and to the fluid being introduced.

The connection means includes a U-shaped pipe assembly 58 connecting the fluid delivery pipe assembly 50 with the supply pipe 44, a valve 60, and a threaded union 62 including threaded male and female members connected between the valve and the delivery pipe assembly.

The valve 60 is of conventional construction, and may be either manually or automatically operated to either open or close the valve, or to throttle fluid flow to the assembly.

The union 62 is also conventional, and when the male and female threaded members are fastened together they form an air-tight passage between the supply pipe and the assembly. Thus, the union is movable between a coupled position in which the sections are in fluid communication with each other and the vertical pipe section of the assembly communicates with the supply pipe, and a decoupled position in which the pipe assembly is completely physically detached from the supply pipe and free to move relative thereto.

The support structure includes an elongated support rail 64 and a plurality of brackets 66 for mounting the support rail in the tank. The spacers 56 are provided with recesses adapted to fit over the rail of the support structure to permit each fluid delivery pipe assembly to be physically lifted vertically along the rail from the tank when the union 62 is decoupled. In this manner, it is possible to permit cleaning, replacement or repair of the nozzles without emptying the tank.

A preferred construction of the fluid delivery pipe assembly is illustrated and described in co-pending U.S. application Ser. No. 08/113,747, filed 31 Aug. 1993, to Schmid, and entitled Slide Rail System for Aeration Diffusers and Mixers.

Figure 3:
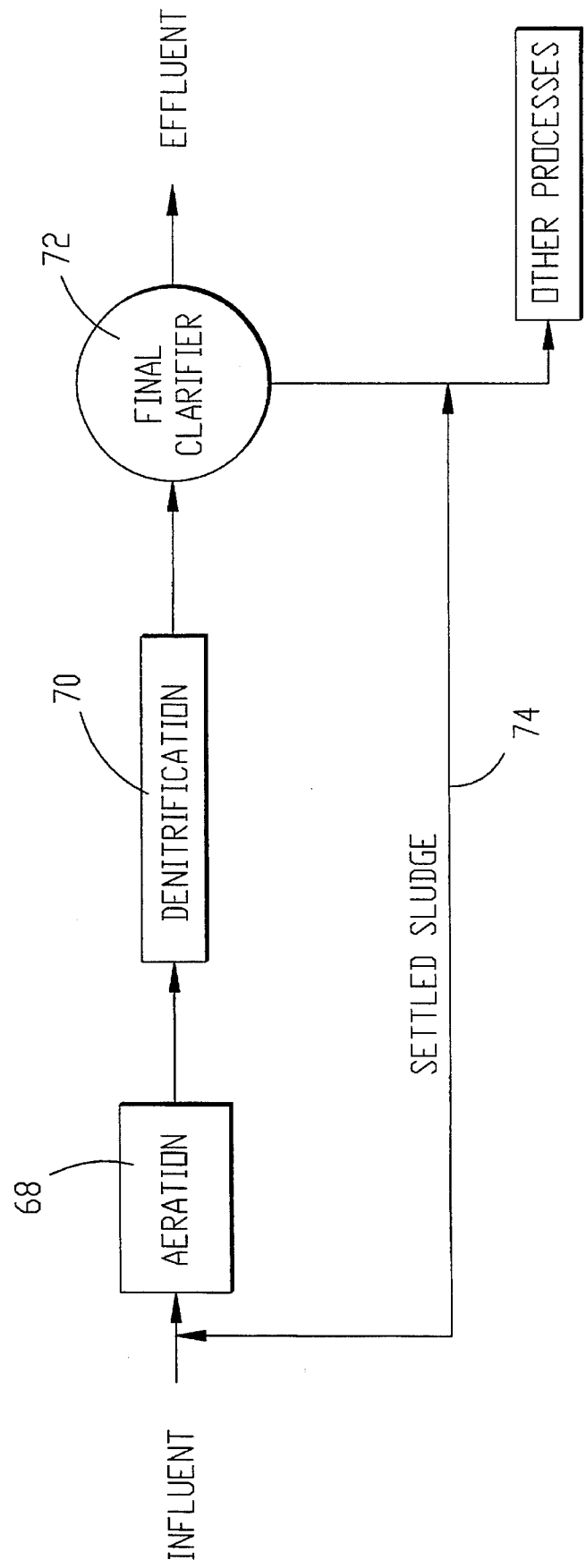
FIG. 3 is a block flow diagram of a wastewater treatment process incorporating the denitrification process of the preferred embodiment.

A wastewater treatment process is illustrated schematically in FIG. 3, incorporating a denitrification process in accordance with the present invention. The process includes submitting an influent to an aeration process at 68, denitrification at 70, and a final settling clarification process at 72. From the final settling tank, effluent is delivered from the process either directly for use, or as an influent to other downstream processes, and settled sludge from the clarifier or settling tank is returned along line 74 to the influent or is otherwise removed from the system. It is noted that the present invention does not relate particularly to any of the other processes other than denitrification, and that the denitrification process may be employed in any desired wastewater treatment program or the like.

The denitrification process of the present invention provides a means for increasing the bacterial level within the tank, improving nitrogen removal from the wastewater without the need for added chemicals. This increased level of bacteria is obtained through an increased concentration of solids within the tank, which is 2–3 times greater than the concentration of solids within the influent introduced into the tank.

The process is described with reference to FIG. 1, and broadly includes the steps of supplying an influent including a relatively small concentration of biomass and a fraction of nitrates, retaining a volume of wastewater having a biomass concentration 2–3 times greater than the influent biomass concentration, and delivering from the tank an effluent including a biomass concentration substantially equal to the influent biomass concentration and being substantially free of nitrates relative to the influent.

The influent is introduced at the bottom of the tank through the inlet pipe, as shown by arrows 76, and typically has a biomass concentration of 2,000–3,000 mg/l, and a nitrate concentration of 5–10 mg/l. The effluent is drawn from the top of the tank through the outlet pipe 14, as shown by arrows 78, and in the steady state of the process also includes a biomass concentration of 2,000–3,000 mg/l. However, the nitrate level within the effluent is reduced as a result of denitrification which occurs within the tank.

The wastewater within the tank is constantly undergoing denitrification, and preferably includes a biomass concentration of between 4,000–9,000 mg/l in the steady state of the process. This concentration is varied to provide an optimum concentration level which is high enough to provide substantially complete denitrification within the tank, while being low enough to prevent plugging of the system.

The increased biomass concentration within the tank is achieved by initially allowing solids introduced with the influent into the tank to settle while liquid passes through the suspension of solids in the tank, as shown by the arrows 80. As the liquid passes through the suspension, any oxygen will be removed and then the nitrate concentration will be reduced. As more solids accumulate within the tank there is a stronger driving force to remove nitrates. However, if allowed to continue in this manner, the process would ultimately permit the solids or biomass concentration within the tank to reach a level at which the flow of liquid through the tank becomes completely plugged.

Figure 2:
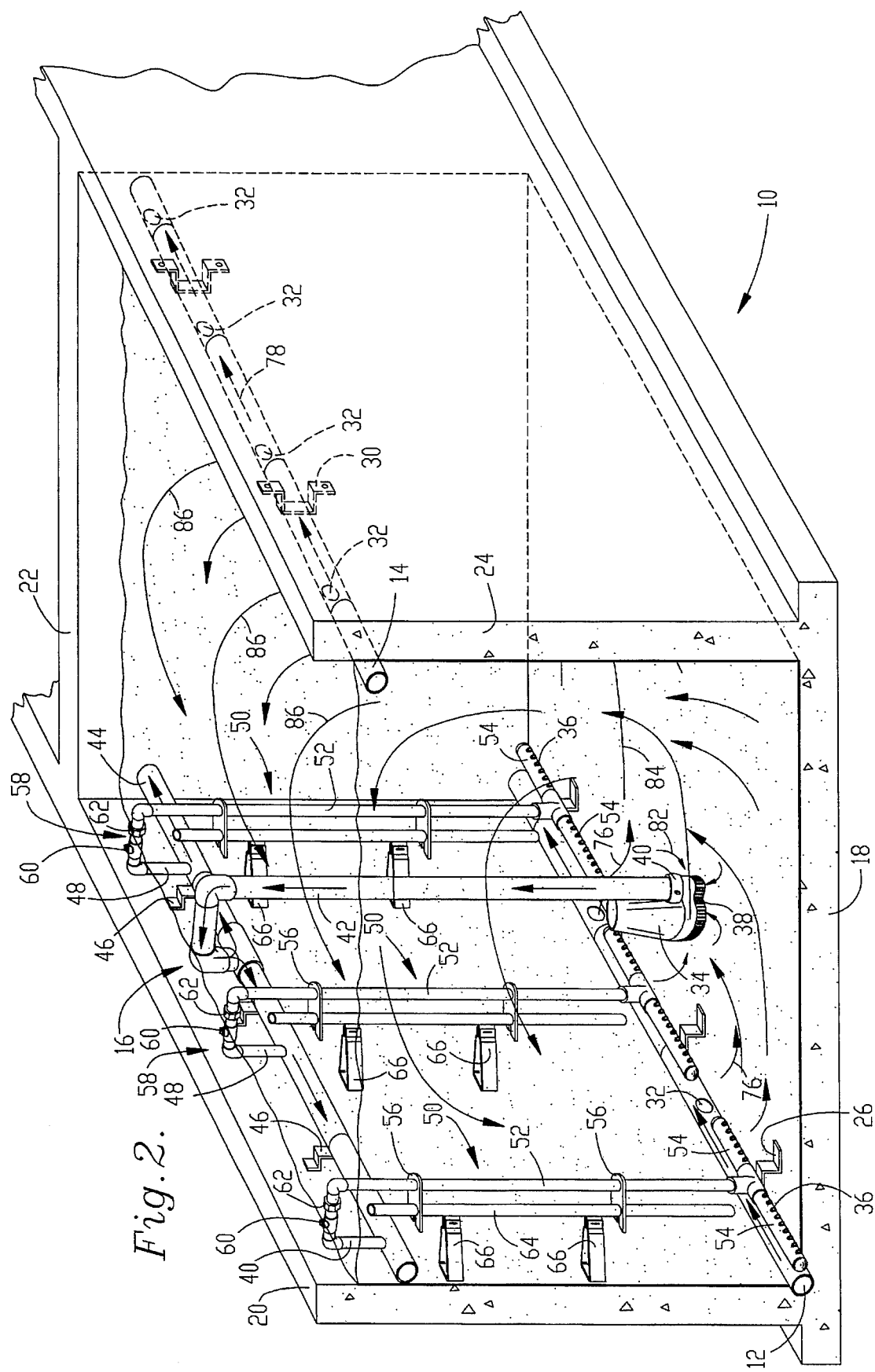
FIG. 2 is a schematic perspective view of a denitrification tank constructed in accordance with the preferred embodiment, illustrating a mixing step of the denitrification process.

Accordingly, the wastewater in the tank is intermittently mixed in order to maintain the biomass in suspension within the tank and to control the concentration of biomass in the tank. Mixing is illustrated in FIG. 2, and is achieved by energizing the pump 34 so that wastewater adjacent the bottom of the tank is drawn into the mixing system 16, as indicated by arrows 82, and reintroduced to the tank through the nozzles 36, as indicated by arrows 84. By injecting the liquid into the tank at an increased velocity, and by directing the injected liquid along the bottom wall parallel to the direction in which influent is introduced, mixing of the wastewater within the tank is achieved, the wastewater turning over within the tank as shown by arrows 86. During this mixing step, the contents of the tank are stirred, and the suspension of solids reforms so that plugging does not occur. In addition, this mixing of the wastewater assists in promoting the release of nitrogen gas produced during denitrification.

The duration of each mixing step is controlled by the operator of the process, by allowing the operator to simply turn the pump on and off as desired. If mixing of the tank contents were continuous, a portion of the influent would be available to pass immediately through the tank to the delivery pipe by short circuiting. However, by providing only intermittent mixing, this potential problem is reduced.

During the periods of settling or non-mixing, the effluent contains a lower biomass concentration than the influent. However, during each mixing step, the effluent includes a higher biomass concentration than the influent. Preferably, the delay between mixing steps is much longer than the duration of each mixing step, resulting in an increase of the biomass concentration until such time as the desired concentration of biomass within the tank is obtained. Thereafter, the ratio between the mixing time and the settling time reaches an equilibrium to where the total weight of solids leaving the anoxic process during mixing is the same as the weight of solids entering the anoxic tank during the sum of both periods, while the level of solids in the tank remains higher than in the influent or effluent.

In an exemplary embodiment, the pump is left off for an operator set time of an hour or more, and is then energized for an operator set time as short as 10 minutes. While the tank is in the settling mode between mixing steps, the liquid and solids continue to enter the tank. The solids are entrained within the suspension and the liquid with the nitrates makes its way up and across the tank through this suspension of biomass, as shown in FIG. 1. Thus, true plug flow and slow intimate mixing of the liquid with the active solids occurs. As the suspension settles toward the bottom of the tank, as indicated by the line 88 in FIG. 1, the wastewater in the tank is mixed to reform the suspension and to promote the release of nitrogen gas.

Although the invention has been described with reference to the preferred embodiment illustrated in the attached drawing figures, it is noted that substitutions may be made and equivalents employed herein without departing from the scope of the invention as recited in the claims.

What is claimed is:

1. An anoxic wastewater denitrification process comprising the steps of:

continuously supplying to the bottom of a tank influent wastewater including a relatively small concentration of biomass and a fraction of nitrates;

retaining in the tank a volume of wastewater having a biomass concentration greater than the influent biomass concentration by initially allowing solids introduced with the influent wastewater into the tank to settle while liquid passes through the suspension of solids in the tank, and delivering from the top of the tank effluent wastewater including a biomass concentration less than the biomass concentration in the influent wastewater so that the biomass concentration in the tank increases to a level 2–3 times greater than the biomass concentration in the influent wastewater;

providing biological denitrification of the wastewater as the wastewater moves upward through the tank;

continuously delivering from the top of the tank effluent wastewater including a biomass concentration substantially less than the biomass concentration in the tank, the effluent wastewater being substantially free of nitrates relative to the influent wastewater;

intermittently mixing the wastewater in the tank to increase the biomass concentration in the effluent wastewater and to maintain the biomass in suspension within the tank.

2. A denitrification process as recited in claim 1, further comprising the steps of regulating the delay time between mixing cycles and the duration of each mixing cycle to regulate the concentration of biomass in the tank.

3. A denitrification process as recited in claim 1, wherein the mixing step includes pumping waste water from adjacent the bottom of the tank and redirecting the pumped waste water along the bottom of the tank.

4. A denitrification process as recited in claim 1, wherein the delay time between mixing cycles is adjustable and exceeds the duration of each mixing cycle.

5. A denitrification process as recited in claim 1, wherein each mixing cycle duration is about 10 minutes.

6. A denitrification process as recited in claim 1, wherein the biomass concentration in the influent and effluent wastewater is between about 2,000–3,000 mg/l, and the biomass concentration in the tank is about 4,000–9,000 mg/l.

* * * * *